(12) United States Patent
Wang et al.

(10) Patent No.: US 8,625,523 B2
(45) Date of Patent: *Jan. 7, 2014

(54) METHOD FOR UPDATING LOCATION INFORMATION OF USER EQUIPMENT

(71) Applicant: Samsung Electronics Co., Ltd., Gyeonggi-do (KR)

(72) Inventors: Hong Wang, Beijing (CN); Lixiang Xu, Beijing (CN); Xiaoqiang Li, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/936,817

(22) Filed: Jul. 8, 2013

(65) Prior Publication Data

US 2013/0310038 A1  Nov. 21, 2013

Related U.S. Application Data

(63) Continuation of application No. 12/918,252, filed as application No. PCT/KR2009/000849 on Feb. 23, 2009, now Pat. No. 8,498,255.

(30) Foreign Application Priority Data

Feb. 25, 2008  (CN) .......................... 2008 1 0081321

(51) Int. Cl.
*H04W 4/00*  (2009.01)
(52) U.S. Cl.
USPC .......................................... 370/329; 370/331
(58) Field of Classification Search
USPC ................................................ 370/329, 331
See application file for complete search history.

(56) References Cited

U.S. PATENT DOCUMENTS

| 5,697,055 A | 12/1997 | Gilhousen et al. |
| 6,564,057 B1 | 5/2003 | Chun et al. |

(Continued)

FOREIGN PATENT DOCUMENTS

| JP | 2009513086 | 3/2009 |
| RU | 2193281 | 11/2002 |

(Continued)

OTHER PUBLICATIONS

3rd Generation Partnership Project; Technical Specification Group Services and System Aspects ; General Packet Radio Service (GPRS).

(Continued)

*Primary Examiner* — Mark Rinehart
*Assistant Examiner* — Angel Brockman
(74) *Attorney, Agent, or Firm* — The Farrell Law Firm, P.C.

(57) ABSTRACT

Methods and apparatus are provided for path switching between an evolved Node B (eNB) and a Mobile Management Entity (MME). The eNB transmits a Path Switch Request message informing that a User Equipment (UE) has changed cells, to the MME. The Path Switch Request message includes an eNB UE S1AP ID, a Tracking Area Identifier (TAI), and cell Identifier (ID). The eNB UE S1AP ID uniquely identifies UE association over an S1 interface within the eNB. The eNB receives a Path Switch Request Acknowledge message including an MME UE S1AP ID and the eNB UE S1AP ID, from the MME. The MME UE S1AP ID uniquely identifies UE association over an S1 interface within the MME. The TAI corresponds to a cell in which the UE is located.

22 Claims, 7 Drawing Sheets

(56) References Cited

U.S. PATENT DOCUMENTS

| | | |
|---|---|---|
| 8,134,974 B2 * | 3/2012 | Chun et al. .................... 370/331 |
| 8,248,943 B2 * | 8/2012 | Ahuja et al. ................. 370/235 |
| 8,412,201 B2 | 4/2013 | Park et al. |
| 2007/0249351 A1 | 10/2007 | Song et al. |
| 2007/0254667 A1 | 11/2007 | Jokinen |
| 2008/0233963 A1 | 9/2008 | Alanara et al. |
| 2008/0259873 A1 | 10/2008 | Ahmavaara et al. |
| 2010/0135250 A1 | 6/2010 | Ishii et al. |

FOREIGN PATENT DOCUMENTS

| | | |
|---|---|---|
| WO | WO2007052922 | 5/2007 |
| WO | WO2007103369 | 9/2007 |
| WO | WO2007144757 | 12/2007 |
| WO | WO2007149509 | 12/2007 |
| WO | WO2008136531 | 11/2008 |
| WO | WO2009081268 | 7/2009 |

OTHER PUBLICATIONS

Enhancements for Evolved Universal Terrestrial Radio Access Network (E-UTRAN) Access (Release 8), 3GPP TS 23.401 V8.0.0, Dec. 2007.

PCT/ISA/237 Written Opinion issued in PCT/KR2009/000849 (4pp).

* cited by examiner

METHOD FOR UPDATING LOCATION INFORMATION OF USER EQUIPMENT

PRIORITY

This application is a Continuation Application of U.S. patent application Ser. No. 12/918,252, which was filed on Aug. 18, 2010, which claims priority under 35 U.S.C. §119(a) to a Chinese patent application filed on Feb. 25, 2008, and assigned Application No. 2008 10081321.3, and which claims the benefit under 35 U.S.C. §365(c) of International Application No. PCT/KR2009/000849 filed on Feb. 23, 2009, the contents of which are incorporated herein by reference.

BACKGROUND OF THE INVENTION

1. Field of the Invention

The present invention relates generally to the communication field, and more particularly, to a method for updating location information of User Equipment (UE) under an enhanced network.

2. Description of the Related Art

A system structure of System Architecture Evolution (SAE) is illustrated in FIG. 1.

A UE 101 is a terminal device for receiving data.

An Evolved Universal Terrestrial Radio Access Network (EUTRAN) 102 is a wireless access network in evolution system SAE, also referred to as Evolved Node B or eNodeB (eNB), which provides Long Term Evolution (LTE) mobile phones with an interface for accessing a wireless network. The EUTRAN 102 connects to a Mobile Management Entity (MME) 103 and a user plane entity Serving Gateway 104 via an interface S1.

MME 103 is used for managing mobile context of the UE 101, session context, and saving user information on security.

The Serving Gateway (S-GW) 104 primarily provides a function of user plane. An interface S1-MME is responsible for establishing a radio access bearer, forwarding messages from the UE 101 to the MME 103 through the wireless access network. The combined function of the MME 103 and the Serving Gateway 104 is similar to that of an original General Packet Radio Service (GPRS) Supporting Node (SGSN) 106. It is possible for both the MME 103 and the Serving Gateway 104 to be located at the same physical entity.

Packet Data Network (PDN) Gateway 105 is used for functions such as accounting, legally monitoring, etc. It is possible for both the Serving Gateway 104 and the PDN Gateway 105 to be located at the same physical entity. The SGSN 106 provides routing for data transmissions in an existing Universal Mobile Telecommunications System (UMTS). The existing SGSN finds corresponding Gateway (GPRS) Supporting Nodes (GGSN) according to Access Point Name (APN).

Home Subscription Subsystem (HSS) 107 is used for storing user information such as current location of the UE 101, an address of the serving node, security related information for the user, an activated Packet Data Protocol (PDP) context for the UE, etc.

Policy and Charging Rules Function (PCRF) 108 provides Quality of Service (QoS0 policy and accounting rules through an interface S7.

In general, a user data stream is transmitted to the Serving Gateway 104 through the PDN Gateway 105. Then, via a GPRS Tunnel Protocol (GTP) channel, data is sent by the Serving Gateway 104 to the ENB 102 in which the UE 101 is located, and the data is sent by the ENB 102 to the UE 101.

FIG. 2 is a diagram illustrating a structure of an S1 interface in the SAE where the MME is a mobile management entity and the S-GW is a data plane entity in an evolved core network. Each ENB connects with several MMEs in an MME pool. Each ENB connects with several S-GWs in the S-GW Pool. The interface between ENBs is called an X2 interface.

In order to avoid transmitting an uplink signaling, such as a Tracking Area (TA) update message, by the UE in an idle mode when the UE frequently moves between ENBs, a multi-TA list is used. When the UE is under a TA updated process, the MME notifies the UE of adjacent multi-TA lists that the UE can access via TA update response messages. The UE saves such TA lists upon the receipt. Thus, UE will not initiate TA update process when moving among several TAs.

SUMMARY OF THE INVENTION

The present invention has been made to address at least the above problems and/or disadvantages and to provide at least the advantages described below. Accordingly, an aspect of the present invention provides a method for updating location information of a UE.

According to one aspect of the present invention, a method is provided for path switching between an eNB and an MME. The eNB transmits a Path Switch Request message informing that a UE has changed cells, to the MME. The Path Switch Request message includes an eNB UE S1AP ID, a Tracking Area Identifier (TAI), and cell Identifier (ID). The eNB UE S1AP ID uniquely identifies UE association over an S1 interface within the eNB. The eNB receives a Path Switch Request Acknowledge message including an MME UE S1AP ID and the eNB UE S1AP ID, from the MME. The MME UE S1AP ID uniquely identifies UE association over an S1 interface within the MME. The TAI corresponds to a cell in which the UE is located.

According to another aspect of the present invention, a method is provided for path switching between an eNB and an MME. The MME receives a Path Switch Request message informing that a UE has changed cells, from the eNB. The Path Switch Request message includes an eNB UE S1AP ID, a TAI, and cell ID. The eNB UE S1AP ID uniquely identifies UE association over an S1 interface within the eNB. The MME transmits a Path Switch Request Acknowledge message including an MME UE S1AP ID and the eNB UE S1AP ID, to the eNB. The MME UE S1AP ID uniquely identifies UE association over an S1 interface within the MME. The TAI corresponds to a cell in which the UE is located.

According to an additional aspect of the present invention, an eNB is provided for path switching between the eNB and an MME. The eNB includes a transmitter for transmitting a Path Switch Request message informing that a UE has changed cells, to the MME. The Path Switch Request message includes an eNB UE S1AP ID, a TAI, and cell ID. The eNB UE S1AP ID uniquely identifies UE association over an S1 interface within the eNB. The eNB also includes a receiver for receiving a Path Switch Request Acknowledge message comprising an MME UE S1AP ID and the eNB UE S1AP ID, from the MME. The MME UE S1AP ID uniquely identifies UE association over an S1 interface within the MME. The TAI corresponds to a cell in which the UE is located.

According to a further aspect of the present invention, an MME is provided for path switching between an eNB and the MME. The MME includes a receiver for receiving a Path Switch Request message informing that a UE has changed cells, from an eNB. The Path Switch Request message includes an eNB UE S1AP ID, a TAI, and cell ID. The eNB UE S1AP ID uniquely identifies UE association over an S1 interface within the eNB. The MME also includes a transmitter for transmitting a Path Switch Request Acknowledge message including an MME UE S1AP ID and the eNB UE S1AP ID, to the eNB. The MME UE S1AP ID uniquely identifies UE association over an S1 interface within the MME. The TAI corresponds to a cell in which the UE is located.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS
OF THE PRESENT INVENTION

Embodiments of the present invention are described in detail with reference to the accompanying drawings. It should be noted that the similar components are designated by similar referenced numerals although they are illustrated in different drawings. Detailed descriptions of constructions or processes known in the art may be omitted to avoid obscuring the subject matter of the present invention.

Figure 1:
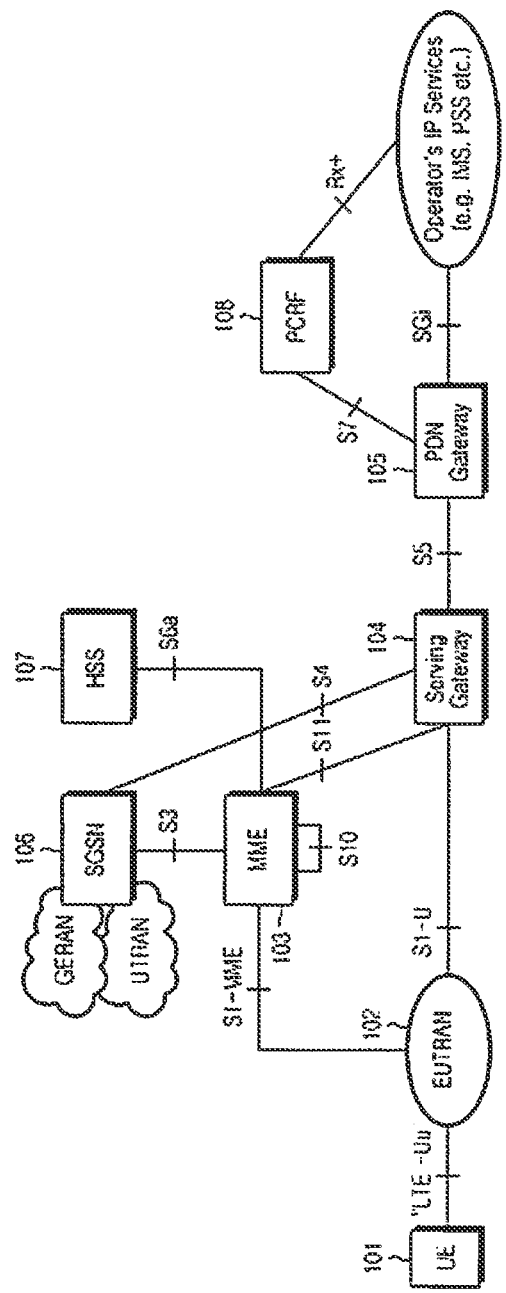
FIG. 1 is a diagram illustrating a structure of an SAE system network.
Figure 2:
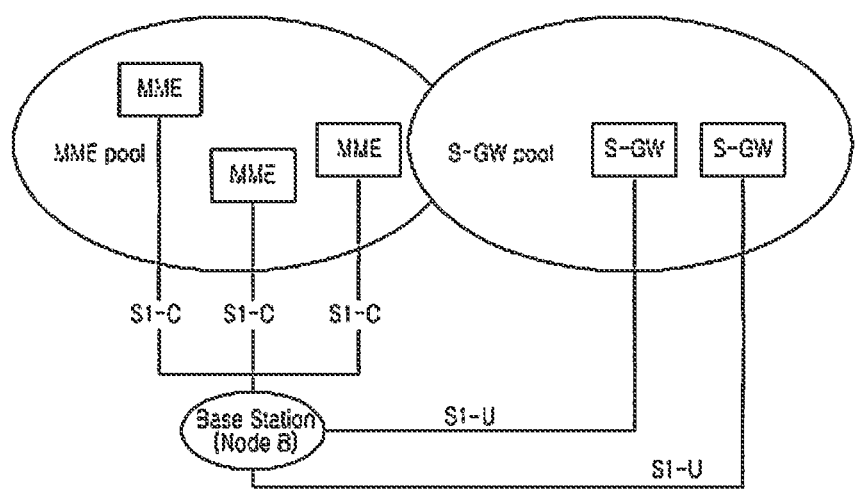
FIG. 2 is a diagram illustrating an S1 interface.
Figure 3:
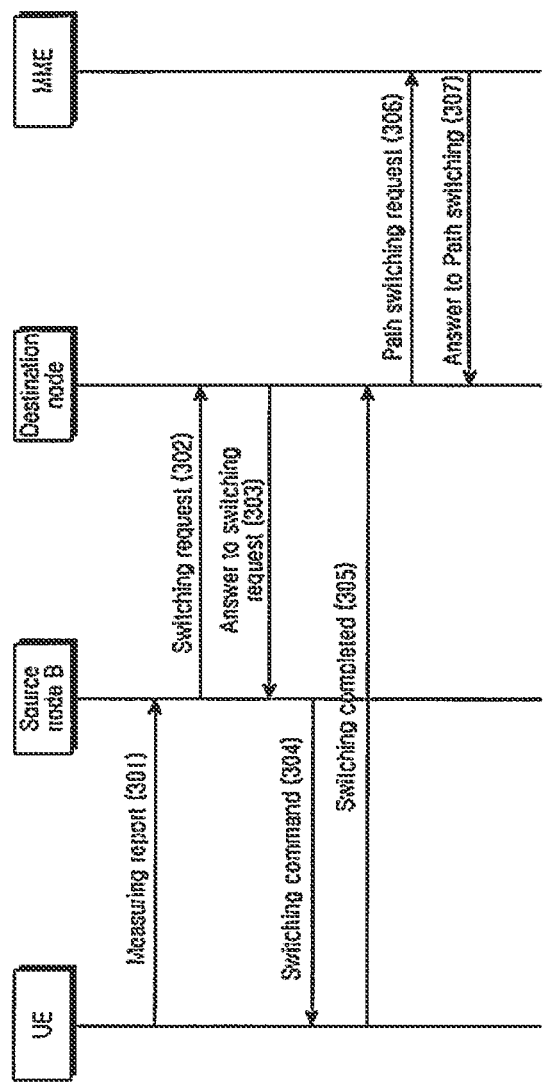
FIG. 3 is a diagram illustrating the UE switched for an X2 interface, according to an embodiment of the present invention.

Referring initially to FIG. 3, a diagram illustrates the UE switched for an X2 interface, according to an embodiment of the present invention.

The UE sends a measuring report message to node B in step 301, in which there may be one or more cells. One cell serves the user and becomes a current cell for the user. The measuring report message includes a measurement for adjacent cells.

The node B determines to switch the user to a cell with a higher quality based on the measuring report of the UE and resource management information in destination cells. If source and destination cells are located in different node Bs, the node B where original cells are located is referred to as a source node B, while the node B for new destination cells is referred to as a destination node B. If there is an X2 interface between source and destination node Bs, source cell determines to switch for the X2 interface and then the source node B sends a switching request message to the destination node B in step 302. The switching request message includes an ID that source cells allocate to the user, a destination cell ID, information that data connection shall be established, data connection (SAE Bearer) ID and QoS information etc.

The destination node B determines whether the user can be accessed based on QoS information for data connection. If the destination cells can provide a required resource, the destination cells will configure the required resource, allocate user ID Cell-Radio Network Temporary Identifier (C-RNTI) used for air interface and eNB UE X2AP Id used for X2 interface, then send a switching response message to the source node B in step 303. This message contains the above mentioned information, successfully established data connection information and an ID for releasing a data connection. The message also contains a switching command that will be sent to the UE and transmitted to source node B through an information element of a container from source node B to destination node B?. The source node B sends the switching command to UE in step 304.

When the UE carries out a synchronization process in destination cells successfully, it will send a switching completed message to destination node B in step 305.

The destination node B sends a path switching request message to an MME in step 306, which includes a transmission stratum address for a new data connection that is also an address for downlink data receipt (eNB UE S1AP Id is used for the S1 interface that destination node B allocates to users) together with location information, such as a Tracking Area Identifier (TAI) in current cell where the UE is located.

MME sends an answer to path switching message to the destination node B in step 307. This message contains a user MME UE S1AP Id and an eNB UE S1AP Id used in the S1 interface.

Figure 4:
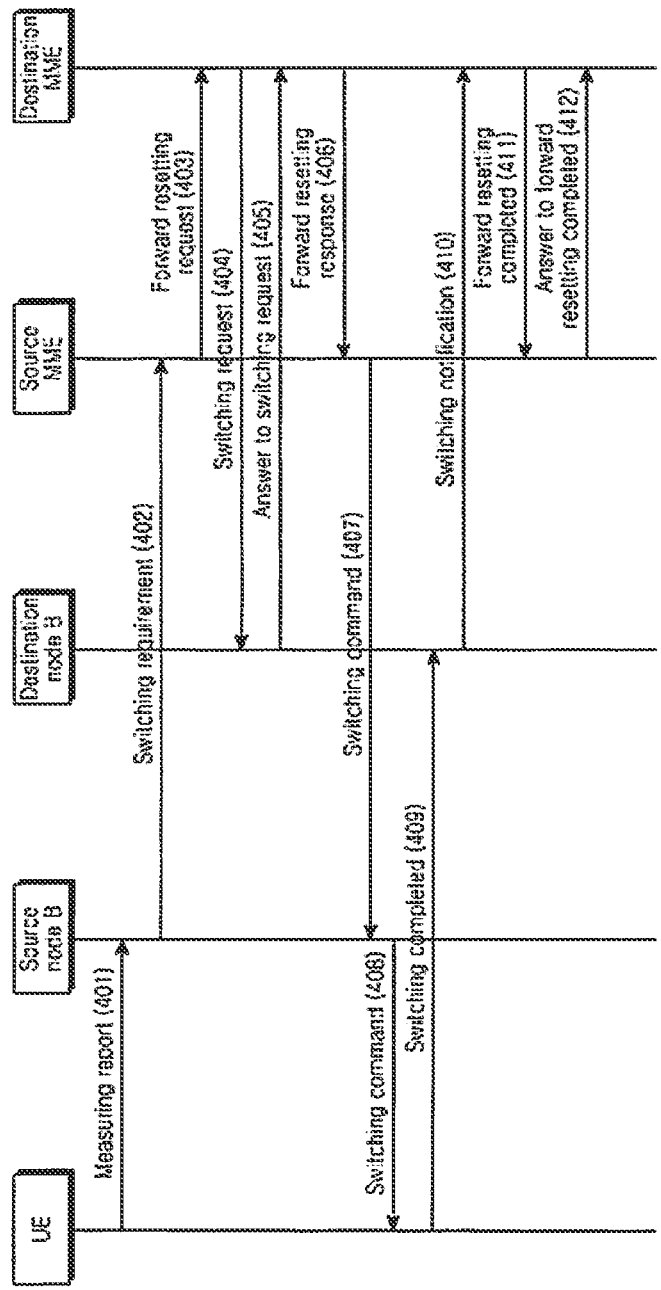
FIG. 4 is a diagram illustrating a UE switched for the S1 interface, according to an embodiment of the present invention.

Alternative embodiments of the present invention are illustrated in FIG. 4. Specifically, the alternative embodiments differ in steps 405 and 410, but are similar in the remaining steps.

The UE sends the measuring report message to node B in step 401. The message includes the measurement for adjacent cells.

The source node B determines to switch the user to a cell with a higher quality based on the measuring report and resource management information in cells. If source and destination cells are located in different node Bs, the source node B determines to make a switch for the S1 interface and sends the switching requirement message to the source MME in step 402. The way of determining is related to the actual implementation, for example the source node B finds no X2 interface between itself and the destination node B. The switching requirement message may include information elements such as, source node B and destination node B information, a container from source node B to destination node B, a user ID used for S1 interface, etc. Destination node B ID and specific-cell ID contained in the message are included in the container. The container is transmitted to the destination node B through MME transparent transmission and contains a user C-RNTI and access stratum information. There are two user IDs used for the S1 interface, i.e., MME UE S1AP Id that the source MME allocates to the user and eNB UE S1AP Id that the source node B allocates to the user.

The source MME finds the MME in corresponding destination node B. Source service MME sends a forward resetting request message to MME that is connected to the destination node B in step 403. The message includes the information that a data connection shall be established.

The destination MME finds the corresponding node B according to the destination node B ID and sends the switching request message to the destination node B in step 404. The switching request includes QoS information for a data connection and container information of Step 402. The message also includes the user MME UE S1AP Id used for the new S1 interface that destination MME allocates to the user.

The destination node B finds destination cells on the node B based on destination cell ID in the container, and determines whether this user can be accessed according to QoS information for data connection. If destination cells can provide a required resource, destination cells configure the required resource, and allocate the user ID used for air interface and the eNB UE S1AP Id used for new S1 interface. The destination node B sends the answer to switching request message to destination MME, which contains the above information, in step 405. The message also includes a switching command, which shall be sent to the UE and transmitted to the source node B through the container's information elements sent from the destination node B to the source node B via MME transparent transmission in which new C-RNTI and access stratum information are contained. In another embodiment of the present invention, the answer to switching request message also includes location information of destination cells such as the TAI.

The destination MME sends the forward resetting response message to the source MME in step 406. The message includes container in Step 405.

The source MME sends the switching command to the source node B. The message includes information of a successfully established SAE data connection and an ID for releasing a data connection. Moreover, it also includes the container of step 405.

Cells on source node B send the switching command to UE in step 408.

The UE stores the message, then carries out synchronization process in destination cells successfully and sends a switching completed message to the destination node B in step 409.

The destination node B sends a switching notification message to the destination MME, which includes a user ID used for S1, based on which MME is able to find context messages in the corresponding UE. In an embodiment of the present invention, the switching notification message also includes location information of destination cells such as the TAI.

The destination MME sends a forward resetting completed message to the source MME in step 411.

Figure 6:
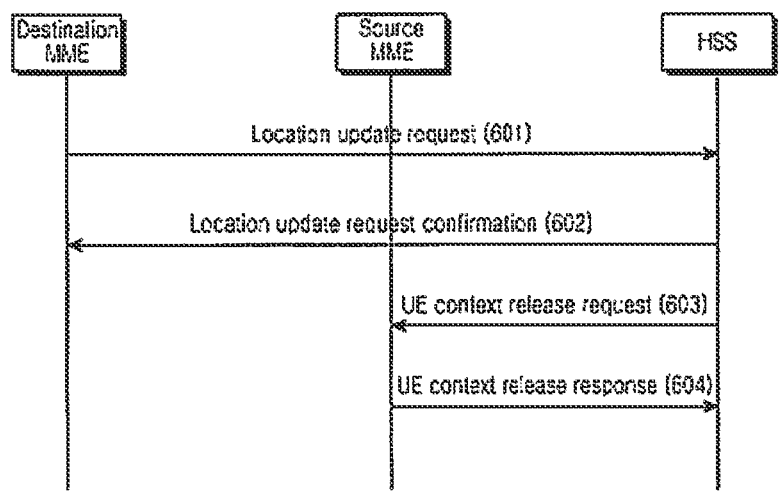
FIG. 6 is a diagram illustrating MME updates for core network entities, according to an embodiment of the present invention.

The source MME sends an answer to forward resetting completed message to the destination MME in step 412. Thus, the resetting process is completed. After the resetting process, a domain update process is initiated by the UE. During the domain update process, UE information is released of the source MME terminal and MME information contained in the HSS is updated. In absence of a domain update process, the MME can carry out the methods shown in FIG. 6 and/or FIG. 7.

Figure 5:
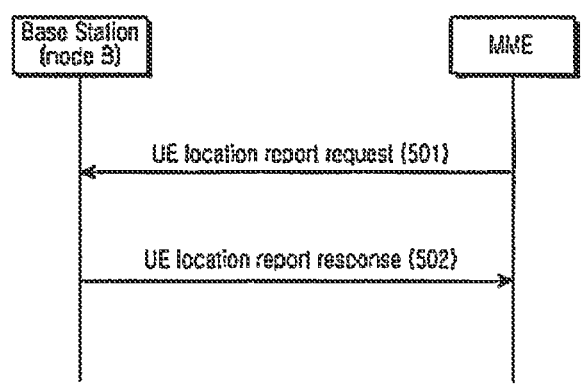
FIG. 5 is a diagram illustrating a UE switched for the S1 interface, according to another embodiment of the present invention.

Another alternative embodiment of the present invention is shown in FIG. 5.

In step 501 the MME sends a location report request message to the node B. The MME can initiate this message anytime or regularly. The message includes a user ID used for the S1 interface. Based on another method for implementation, the MME sends a message in step 501, carries out configuration to allow the node B to report the location information of the UE, and then node B sends the message in step 502 regularly or each time a new domain is switched based on configuration information in step 501. Specifically, the messages in step 501 can also be transmitted once, and those in step 502 can be transmitted several times.

In step 502 the node B finds location information in a current cell in which the user is presently located, such as TAI. Then it sends the location report response message to the MME, which includes the user ID used for the S1 interface and a domain ID of a current cell where the user is located, such as TAI. Next, the MME can perform the steps shown in FIG. 6 and/or FIG. 7.

The UE moves into a new MME from the source MME, where the new MME is the destination MME. The destination MME obtains location information of the cells in which the UE is currently located, such as TAI, based on the embodiment of the present invention described in FIG. 5. In step 601, the MME sends a location update request message to HSS, database entity of operation and maintenance, which includes MME information for the current UE, such as an MME address or ID.

The HSS sends a response message, location update request confirmation, to the destination MME in step 602.

The HSS sends a UE context release request message to the source MME to request deletion of the context information of UE in step 603.

In step 604, the source MME deletes the UE information and then sends a UE context release response message to HSS.

Figure 7:
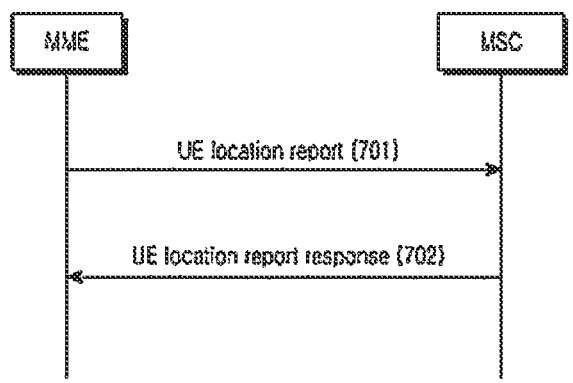
FIG. 7 is a diagram illustrating MME updates for control entities in circuit domain, according to another embodiment of the present invention.

With respect to FIG. 7, in step 701, the MME sends the UE location report message to the MSC. The message includes current location information of the UE, such as TAI.

The MSC stores location information of the UE and sends a UE location report confirmation to the MME in step 702. Location information described in this invention can correspond not only to TAI, but also to other location information related to the cells where UE is located.

When users in a connection mode move to a domain outside a TA list, they need to initiate a domain update process. Conventionally, during the domain update process, the UE will obtain a new temporary ID for use in an idle mode. If the domain update process is prevented for users in a connection mode, it effectively reduces signaling.

Circuit signaling needs to be transmitted through an evolved network, and an MSC is a control entity for a circuit domain that serves in a certain domain. The domain location where the UE is currently located is known to understand whether circuit domain signaling is sent to the MSC correctly.

The embodiments of the present invention provide methods for updating location information of the UE to support the UE in a connection mode moving among different geographical domains without implementing the domain update process. It also supports signaling in the circuit domain to be transmitted in a newly evolved network.

While the invention has been shown and described with reference to certain embodiments thereof, it will be understood by those skilled in the art that various changes in form and detail may be made therein without departing from the spirit and scope of the present invention as defined by the appended claims and their equivalents.

What is claimed is:

1. A method for path switching between an evolved Node B (eNB) and a Mobile Management Entity (MME), the method comprising the steps of:

transmitting, by the eNB, a Path Switch Request message informing that a User Equipment (UE) has changed cell, to the MME, the Path Switch Request message comprising an eNB UE S1AP ID, a Tracking Area Identifier (TAI), and cell Identifier (ID), the eNB UE S1AP ID uniquely identifying UE association over an S1 interface within the eNB; and receiving, by the eNB, a Path Switch Request Acknowledge message comprising an MME UE S1AP ID and the eNB UE S1AP ID, from the MME, the MME UE S1AP ID uniquely identifying UE association over an S1 interface within the MME, wherein the TAI corresponds to a cell in which the UE is located.

2. The method according to claim 1, further comprising:
receiving, by the eNB, a Switching Request message from a source node B;
transmitting, by the eNB, a Switching Response message to the source node B; and
receiving, by the eNB, a Switching Completed message from the UE.

3. The method according to claim 2, wherein the Switching Request message comprises a destination cell ID, a data connection ID, and Quality of Service (QoS) information.

4. The method according to claim 1, further comprising:
receiving, by the eNB, a Switching Request message from a destination MME;
transmitting, by the eNB, an Answer To Switching Request message to the destination MME;
receiving, by the eNB, a Switching Completed message from the UE; and
transmitting, by the eNB, a Switching Notification message to the destination MME.

5. The method according to claim 1, further comprising transmitting a UE domain ID to the MME.

6. The method according to claim 1, further comprising:
receiving, by the eNB, a UE Location Report Request message from the MME; and
transmitting, by the eNB, a UE Location Report Response message to the MME.

7. The method according to claim 6, wherein the UE Location Report Response message comprises a domain ID TAI in a cell where the UE is located.

8. A method for path switching between a evolved Node B (eNB) and a Mobile Management Entity (MME), the method comprising the steps of:
receiving, by the MME, a Path Switch Request message informing that a User Equipment (UE) has changed cell, from the eNB, the Path Switch Request message comprising an eNB UE S1AP ID, a Tracking Area Identifier (TAI), and cell Identifier (ID), the eNB UE S1AP ID uniquely identifying UE association over an S1 interface within the eNB; and
transmitting, by the MME, a Path Switch Request Acknowledge message comprising an MME UE S1AP ID and the eNB UE S1AP ID, to the eNB, the MME UE S1AP ID uniquely identifying UE association over an S1 interface within the MME,
wherein the TAI corresponds to a cell in which the UE is located.

9. The method according to claim 8, further comprising receiving a UE domain ID from the eNB.

10. The method according to claim 8, further comprising:
transmitting, by the MME, a UE Location Report Request message to the eNB; and
receiving, by the MME, a UE Location Report Response message from the eNB.

11. The method according to claim 10, wherein the UE Location Report Response message comprises a domain ID TAI in a cell where the UE is located.

12. A evolved Node B (eNB) for path switching between the eNB and a Mobile Management Entity (MME), the eNB comprising:
a transmitter for transmitting a Path Switch Request message informing that a User Equipment (UE) has changed cell, to the MME, the Path Switch Request message comprising an eNB UE S1AP ID, a Tracking Area Identifier (TAI), and cell Identifier (ID), the eNB UE S1AP ID uniquely identifying UE association over an S1 interface within the eNB; and
a receiver for receiving a Path Switch Request Acknowledge message comprising an MME UE S1AP ID and the eNB UE S1AP ID, from the MME, the MME UE S1AP ID uniquely identifying UE association over an S1 interface within the MME,
wherein the TAI corresponds to a cell in which the UE is located.

13. The eNB according to claim 12, wherein the receiver receives a Switching Request message from a source node B, the transmitter transmits a Switching Response message to the source node B, and the receiver receives a Switching Completed message from the UE.

14. The eNB according to claim 13, wherein the Switching Request message comprises a destination cell ID, a data connection ID, and Quality of Service (QoS) information.

15. The eNB according to claim 12, wherein the receiver receives a Switching Request message from a destination MME, the transmitter transmits an Answer To Switching Request message to the destination MME, the receiver receives a Switching Completed message from the UE, and the transmitter transmits a Switching Notification message to the destination MME.

16. The eNB according to claim 12, wherein the transmitter transmits a UE domain ID to the MME.

17. The eNB according to claim 12, wherein the receiver receives a UE Location Report Request message from the MME, and the transmitter transmits a UE Location Report Response message to the MME.

18. The eNB according to claim 17, wherein the UE Location Report Response message comprises a domain ID TAI in a cell where the UE is located.

19. A Mobile Management Entity (MME) for path switching between a evolved Node B (eNB) and the MME, the MME comprising:
a receiver for receiving a Path Switch Request message informing that a User Equipment (UE) has changed cell, from the eNB, the Path Switch Request message comprising an eNB UE S1AP ID, a Tracking Area Identifier (TAI), and cell Identifier (ID), the eNB UE S1AP ID uniquely identifying UE association over an S1 interface within the eNB; and
a transmitter for transmitting a Path Switch Request Acknowledge message comprising an MME UE S1AP ID and the eNB UE S1AP ID, to the eNB, the MME UE S1AP ID uniquely identifying UE association over an S1 interface within the MME,
wherein the TAI corresponds to a cell in which the UE is located.

20. The MME according to claim 19, wherein the receiver receives a UE domain ID from the eNB.

21. The MME according to claim 19, wherein the transmitter transmits a UE Location Report Request message to the eNB, and the receiver receives a UE Location Report Response message from the eNB.

22. The MME according to claim 21, wherein the UE Location Report Response message comprises a domain ID TAI in a cell where the UE is located.

* * * * *